UNITED STATES PATENT OFFICE.

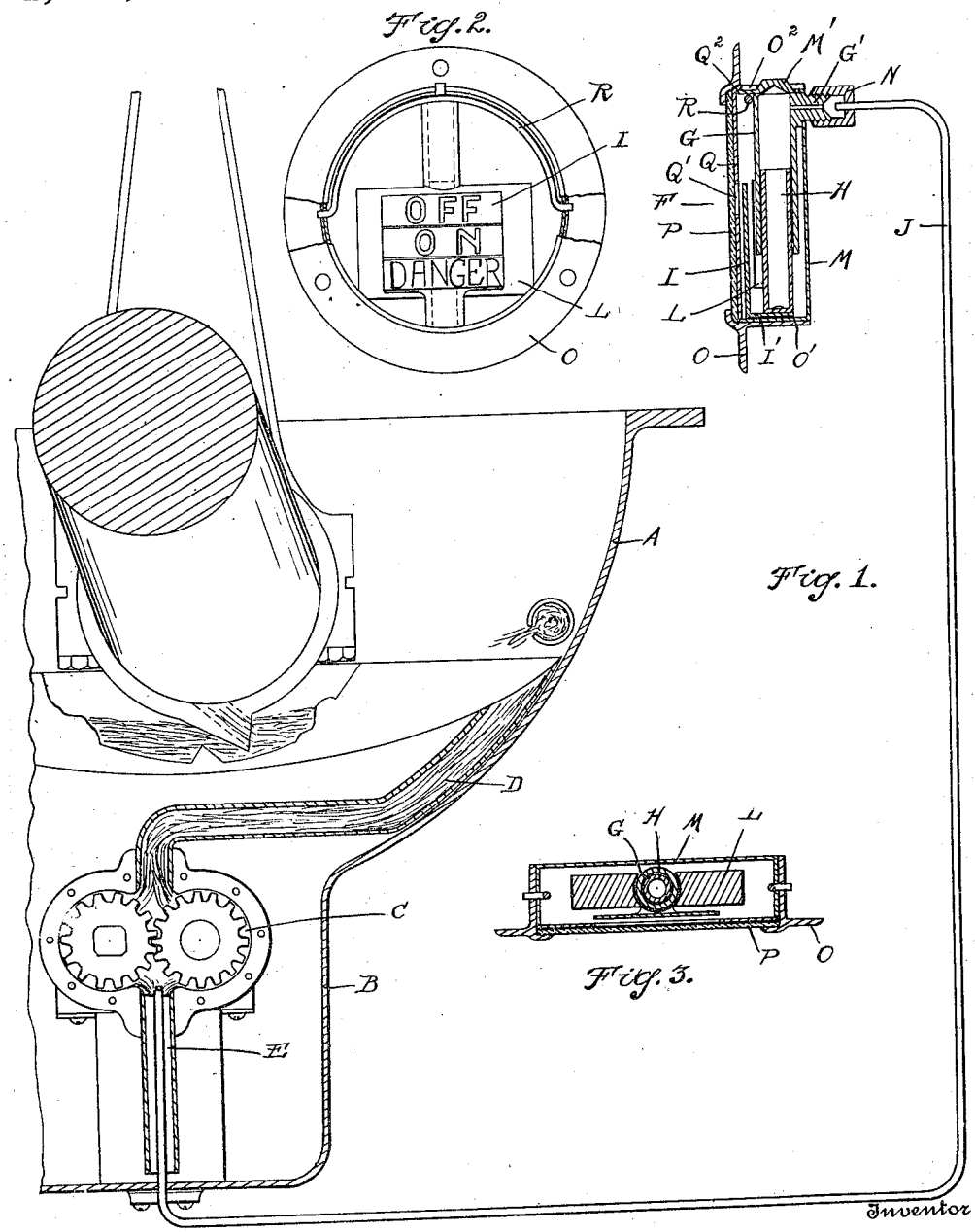

JAMES ERSKINE, OF FLINT, MICHIGAN, ASSIGNOR TO GENERAL MOTORS CORPORATION, OF DETROIT, MICHIGAN, A CORPORATION OF DELAWARE.

GAGE.

1,295,718.

Specification of Letters Patent.   Patented Feb. 25, 1919.

Application filed August 27, 1917.   Serial No. 188,370.

*To all whom it may concern:*

Be it known that I, JAMES ERSKINE, a citizen of the United States of America, residing at Flint, in the county of Genesee and State of Michigan, have invented certain new and useful Improvements in Gages, of which the following is a specification, reference being had therein to the accompanying drawings.

The invention relates to gages particularly designed for use in indicating the flow of lubricant, and the invention comprises the novel construction as hereinafter set forth.

In the drawings:

Figure 1 is a diagrammatic view showing my gage in connection with the propelling pump of an engine-lubricating system;

Fig. 2 is a sectional elevation of the gage; and

Fig. 3 is a horizontal section therethrough.

In the present state of the art various gages have been devised which operate by the positive pressure developed by the lubricant pump, this pressure being usually communicated to the indicator by air. One objection to such constructions is that where there is any clogging or stoppage of the lubricant while the pump is still in operation the pressure may rise to a point where it will force lubricant into the gage or indicator. I have avoided this difficulty by operating my improved gage or indicator from the suction side of the pump, so that there can never be any discharge of lubricant at the indicator.

As shown, A is the crank case of an engine, B the oil-well therein, C a lubricating pump, shown as of the intermeshing-gear type, D the discharge conduit from said pump and E the suction conduit thereof. F is my improved gage or indicator, which comprises a cylinder G with a slidable piston H therein and an indicator I attached to the piston. The cylinder G is connected by a conduit J with the pump, said conduit extending in to the suction conduit E, as shown. Thus when the pump is in operation air will be drawn out from the conduit J into the liquid in the pump, causing the piston H to rise by atmospheric pressure and display the indicator I. Sufficient clearance is provided between the piston and cylinder to permit a slight leakage of air, so that whenever the flow of lubricant through the suction conduit is arrested the air pressure within the cylinder will equalize that without, and the piston and indicator will drop.

It is obvious that with this construction there can be no danger of discharging the lubricant in to the indicator, as the flow is in the reverse direction. On the other hand, a positive indication of the flow of lubricant through the pump is given and by properly proportioning the bleed or leakage of air a falling in the flow beyond a predetermined point will be observed on the indicator. Under certain conditions, such for instance as the freezing of water which is mixed with the oil, there may be a stoppage in the lubricant circulating system, which if the pump continues to operate is dangerous. I therefore have provided means for indicating such a condition, which as shown consists of a weighted stop L, which arrests movement of the piston and indicator under normal conditions and which will be lifted to display a danger signal under abnormal conditions. It is obvious that if there is a stoppage which prevents flow of oil through the suction conduit E, a high vacuum will be formed which, reacting upon the conduit J and cylinder G, will lift the piston and weight L.

To produce an inexpensive construction to manufacture and one easily assembled, my gage is preferably specifically constructed as follows. The cylinder G is formed with a laterally-extending nipple G' which passes through the back of a cup-shaped housing M and is adapted to engage a coupling N for the securing of the conduit J. The indicator I has an angle shank I' attaching to the lower end of the piston, and the weighted stop L is sleeved upon the cylinder and lies adjacent to the indicator. O is a ring adapted for mounting upon the vehicle dash or other point of support. P is a glass face held by the ring and Q is an opaque disk adjacent to the glass having a slot Q' therein through which the signal is displayed. The ring O has a cylindrical flange O' for receiving the cup-shaped member M and the parts after engagement are locked by a spring R within the housing, having its opposite ends engaging registering apertures in the member M and flange O'. All of the circular parts may be held in proper registration by providing a slot O² in the flange O' with which is engaged projecting lugs Q² and M' on the members Q and M respectively.

In operation, when the pump is idle, as long as oil is not flowing through the suction conduit the piston H will drop to the bottom of the cylinder G, thereby lowering the indicator I to display the word "Off" or other indication that no oil is feeding. This position will also be assumed whenever there is a failure of oil supply which will unseal the end of the conduit J in the suction conduit E. When there is oil and the pump is in operation, the suction produced in the conduit J will lift the piston, carrying the indicator with it, until the shank I' comes in contact with the weighted stop L. Under normal conditions the suction is insufficient to lift this weight and therefore the indicator will be in a position to display the word "On", or other indication that the oil is circulating. If, however, there is an abnormal condition, as previously described, the suction will lift the weight which will move the indicator to a position displaying the word "Danger".

What I claim as my invention is:

1. The combination with a liquid-circulating system and a hydraulic pump for actuating the same, of a pneumatically-operated gage for indicating conditions in said system, and a connection between said indicator and the suction conduit of said pump transmitting to the gage a subatmospheric pressure created by the pump.

2. The combination with a liquid-circulating system, of means for creating a sub-atmospheric pressure by a flow of liquid in said system, and a gage actuable by the sub-atmospheric pressure thus created for indicating conditions existing in said system.

3. The combination with a liquid-circulating system, of common means for inducing a flow of liquid in said system and for creating a sub-atmospheric pressure, and a gage actuable by the sub-atmospheric pressure thus created for indicating conditions existing in said system.

In testimony whereof I affix my signature.

JAMES ERSKINE.